US005317863A

United States Patent [19]

Ciccia et al.

[11] Patent Number: 5,317,863

[45] Date of Patent: Jun. 7, 1994

[54] GAS TURBINE COMBUSTION CHAMBER WITH ADJUSTABLE PRIMARY OXIDIZER INTAKE PASSAGEWAYS

[75] Inventors: Patrick, S. A. Ciccia, Paris; Patrice A. Commaret, Maincy; Eric J. S. Lancelot, Melun, all of France

[73] Assignee: Societe Nationale D'Etude et de Construction de Moteurs D'Aviation "S.N.E.C.M.A.", Paris, France

[21] Appl. No.: 57,492

[22] Filed: May 6, 1993

[30] Foreign Application Priority Data

May 6, 1992 [FR] France ............ 92 05559

[51] Int. Cl.[5] ............ F02C 9/00

[52] U.S. Cl. ............ 60/39.23

[58] Field of Search ............ 60/39.23, 39.26, 39.29

[56] References Cited

U.S. PATENT DOCUMENTS

| | | | |
|---|---|---|---|
| 1,329,279 | 1/1920 | Voorheis . | |
| 3,899,881 | 8/1975 | Arvin et al. | 60/737 |
| 3,930,368 | 1/1976 | Anderson et al. | 60/39.23 |
| 4,497,170 | 2/1985 | Elliott et al. | 60/39.23 |
| 4,766,722 | 8/1988 | Bayle-Laboure et al. | 60/39.23 |
| 5,003,768 | 4/1991 | Kappler et al. | 60/39.23 |

FOREIGN PATENT DOCUMENTS

| | | |
|---|---|---|
| 0100135 | 2/1984 | European Pat. Off. . |
| 1277980 | 6/1972 | United Kingdom . |
| 2244534 | 12/1991 | United Kingdom . |

*Primary Examiner*—Richard A. Bertsch
*Assistant Examiner*—Timothy S. Thorpe
*Attorney, Agent, or Firm*—Bacon & Thomas

[57] ABSTRACT

A combustion chamber structure wherein the combustion chamber extends around a central, longitudinal axis and has primary oxidizer intake passageways whose positions along the central axis relative to an end of the combustion chamber are adjustable depending upon the operating conditions of the gas turbine engine. By controlling axial positions of the primary oxidizer intake passageways, the dwell time of the combustion gases and primary oxidizer inside the combustion zone of the chamber may also be controlled so as to increase the stability of the combustion, while at the same time minimizing the polluting emissions. The invention also encompasses the concept of adjusting the cross-sectional area of the primary oxidizer intake passageways as their positions along the central axis are adjusted. This enables a more accurate control of the volume of the primary oxidizer flow in addition to controlling the location of the flow.

15 Claims, 5 Drawing Sheets

GAS TURBINE COMBUSTION CHAMBER WITH ADJUSTABLE PRIMARY OXIDIZER INTAKE PASSAGEWAYS

BACKGROUND OF THE INVENTION

The present invention relates to a combustion chamber for a gas turbine engine, more particularly such a structure in which the positions of the primary oxidizer intake passageways are variable relative to an end of the combustion chamber.

Known combustion chambers for gas turbine engines have numerous oxidizer intake orifices which enable oxidizer to enter the interior of the combustion chamber to enhance combustion of the fuel/oxidizer mixture within the combustion chamber. A distinction must be made between the primary oxidizer intake orifices which admit oxidizer which is essential to the actual combustion of the fuel/oxidizer mixture within the combustion chamber, and dilution oxidizer intake orifices through which oxidizer is admitted to the combustion chamber to dilute the combustion gases and to homogenize the temperature of the burnt gases, as well as to properly adjust the gas flow to feed the gas turbine located at the exit of the combustion chamber.

The primary oxidizer intake orifices must accommodate vastly different operational modes of the gas turbine engine combustion chamber. When the gas turbine is operated at low power, the dwell time of the combustion gases within the intake zone of the oxidizer fed into the combustion chamber around the fuel injecters, as well as that fed through the intake orifices of the primary oxidizer, must be sufficiently long so that the combustion stability is enhanced and the polluting emissions of carbon monoxide (CO) and unburnt hydrocarbons (CHx) can be reduced. Under full power operating conditions, the dwell time of the combustion gases within the intake zone must be shortened in order to reduce the polluting emissions of nitrogen oxide (NOx). Known combustion chamber designs have been unable to fully meet these conflicting requirements.

SUMMARY OF THE INVENTION

The present invention relates to a combustion chamber structure wherein the combustion chamber extends around a central, longitudinal axis and has primary oxidizer intake passageways whose positions along the central axis relative to an end of the combustion chamber are adjustable depending upon the operating conditions of the gas turbine engine. By controlling axial positions of the primary oxidizer intake passageways, the dwell time of the combustion gases and primary oxidizer inside the combustion zone of the chamber may also be controlled so as to increase the stability of the combustion, while at the same time minimizing the polluting emissions. The invention also encompasses the concept of adjusting the cross-sectional area of the primary oxidizer intake passageways as their positions along the central axis are adjusted. This enables a more accurate control of the volume of the primary oxidizer flow in addition to controlling the location of the flow.

The combustion chamber according to the present invention has walls defining opposite sides of the combustion chamber, as well as an end wall interconnecting the opposite sides and defining an end of the combustion chamber. Known devices for injecting fuel and allowing oxidizer to pass through the end wall are incorporated to place a fuel/air mixture within the combustion chamber, which fuel/air mixture is subsequently ignited. The sides of the combustion chamber define a plurality of primary oxidizer intake orifices with control devices to control the intake of the primary oxidizer into the combustion chamber.

The sidewalls of the combustion chamber define primary oxidizer intake orifices having an elongated configuration in which opposite, parallel sides extend generally parallel to the central longitudinal axis of the combustion chamber and are interconnected by curved end portions. Control plates are associated with an exterior surface of the combustion chamber so as to slide relative to the combustion chamber walls. The control plates define second primary oxidizer intake orifices which, in one extreme position of the control plates, are each superimposed over a first primary intake oxidizer orifice. The overlapping, coincident portions of the first and second primary intake orifices define the primary oxidizer intake passageways.

An actuating device is connected to the control plates to move the plates in directions generally parallel to the longitudinal axis of the combustion chamber. As the control plates are moved axially towards the closed end of the combustion chamber the positions of the primary oxidizer intake passageways are also moved toward the closed end of the combustion chamber. The actuating device may also be operatively connected to a known diaphragm device which controls the combustion oxidizer passing into the combustion chamber around the fuel injecter. The actuating device may be interconnected with the diaphragm and the control plates such that the oxidizer flow through the primary oxidizer intake passages is at a maximum when the flow through the diaphragm device is at a minimum and vice versa. The maximum flow through the primary oxidizer intake passageways may also occur when they are in their most axially displaced positions away from the closed end wall of the combustion chamber.

The second primary oxidizer intake orifices may be either generally circular in cross-sectional configuration, or may have an elongated cross-sectional configuration similar to that of the first primary oxidizer intake orifices. In the latter instance, the first and second primary oxidizer intake orifices are completely overlapping, or coincident, in their furthermost positions from the closed end of the combustion chamber wall. In these positions, the primary oxidizer intake passageways have a maximum cross-sectional area equal to the cross-sectional area of the second primary oxidizer intake orifices. As the control plates are moved axially towards the closed end of the combustion chamber, the second primary oxidizer intake orifices are moved out of coincidence with the first primary oxidizer intake orifices such that the primary oxidizer intake passageways are defined only by the overlapping portions of the first and second orifices. In this embodiment, not only are the positions of the primary oxidizer intake passageways adjusted, but their cross-sectional areas are also reduced as their positions are moved towards the closed end of the combustion chamber.

In the instance where the primary oxidizer intake orifices are circular in configuration, such are coincident with the first primary oxidizer intake orifices throughout the axial travel of the control plates. In this particular embodiment, the areas of the primary oxidizer intake passageways do not vary as their axial positions are adjusted. If a diaphragm device is utilized with this embodiment, the flow through the primary oxidizer intake passageways does not vary in quantity as the axial positions vary and as the combustion oxidizer passing through the diaphragm varies. In both configurations, the pressure drop, or loss of charge of the oxidizer flow passing through the primary oxidizer intake passageways and the diaphragm device are equal in all configurations of the combustion chamber structure.

The actuating device may be an actuating ring extending about an external surface of the combustion chamber so as to be rotatable about the central axis of the combustion chamber. The actuating ring is connected to each of the control plates such that rotational movement of the actuating ring causes axial movement of each of the control plates. If more than one actuating ring is utilized, they may be interconnected so as to move simultaneously.

The main advantage of the combustion chamber structure according to this invention as the progressive control of the primary oxidizer intake passageways resulting in satisfactory operation with respect to low power combustion stability and the reduction of pollution emissions in all operational modes.

DETAILED DESCRIPTION OF THE PREFERRED EMBODIMENTS

Figure 1:
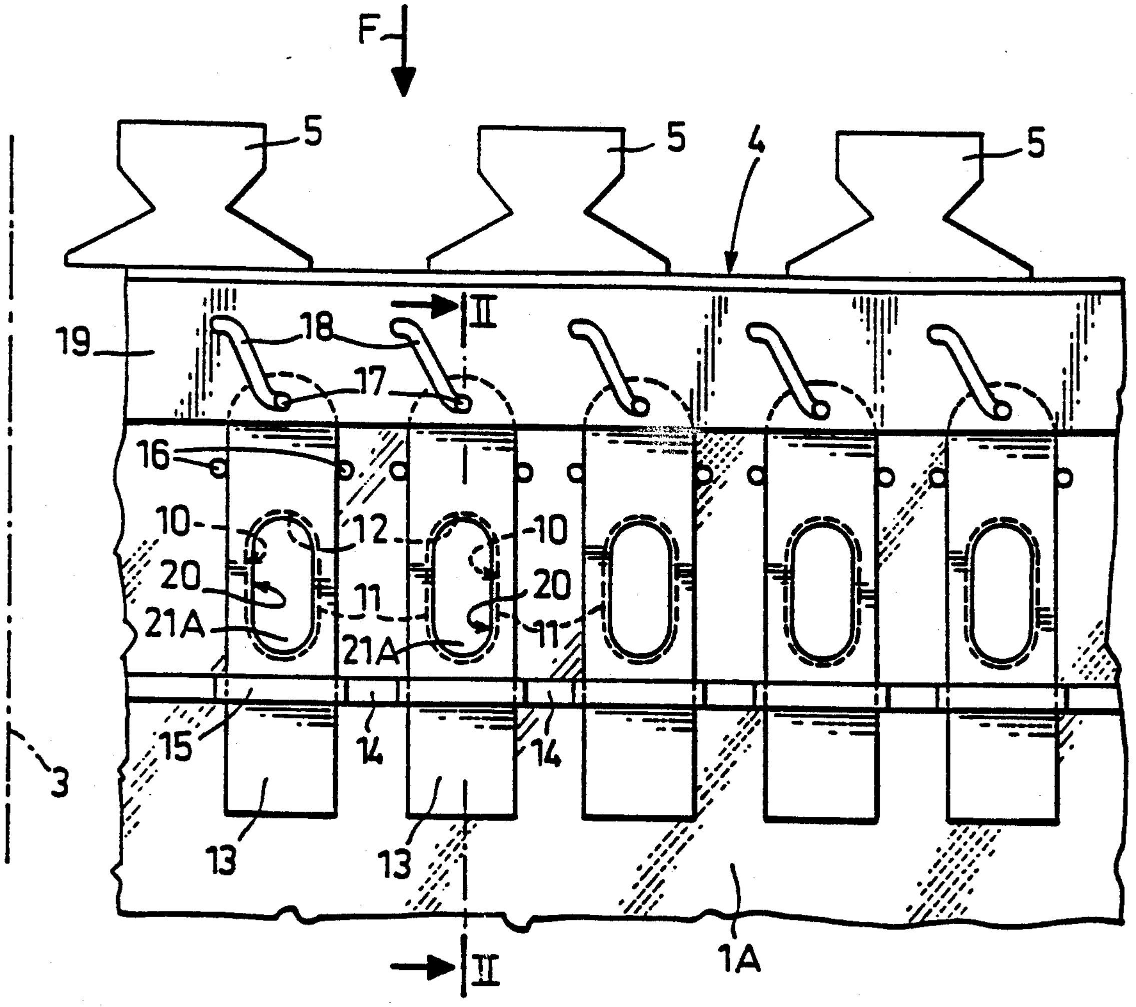
FIG. 1 is a partial, developed, top view of an annular combustion chamber according to the present invention illustrating the control plates in first positions.

A first embodiment of the combustion chamber according to the present invention is illustrated in FIGS. 1–6 and constitutes an annular combustion chamber comprising an outer wall 1 and an inner wall 2 concentrically arranged about central longitudinal axis 3. An end wall 4 links the outer wall 1 and the inner wall 2 and defines a generally closed end of the combustion chamber inside which combustion of a fuel/oxidizer mixture takes place.

A plurality of fuel injecters 5 are mounted on the end wall 4 in a regular annular array to inject fuel into the combustion chambers. In known fashion, the fuel injecters 5 may also comprise combustion oxidizer intake orifices 6 which may also have oxidizer flow control diaphragms 7 associated therewith in order to control the flow of oxidizer through the combustion oxidizer intake orifices 6. The known control diaphragms 7 may be equipped with control means, schematically indicated by lever 8, for controlling the rotation of a diaphragm collar 9 to selectively open or close the intake orifices 6. Each fuel injecter 5 may be fitted with such a known diaphragm assembly 7. The invention may be utilized with combustion chambers having such flow control diaphragms, or may be utilized with combustion chambers without such flow control diaphragms.

Figure 4:
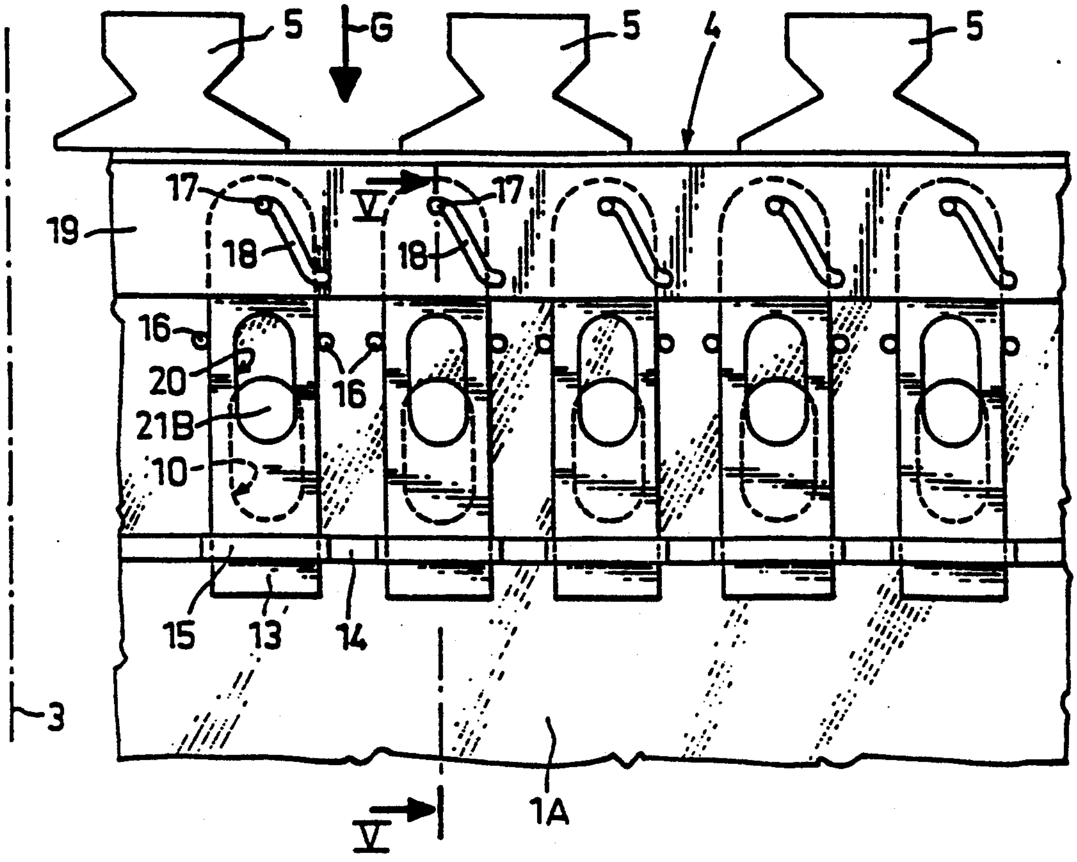
FIG. 4 is a partial view similar to FIG. 1, illustrating the control plates in second positions.

As illustrated in FIGS. 1 and 4, the outer wall 1 defines a plurality of primary oxidizer intake orifices 10 each having an elongated configuration with opposite sides 11 extending generally parallel to the central axis 3. Sides 11 are joined at either ends by semi-circular portions 12 to form the axially elongated, first primary oxidizer intake orifices 10. On the outer surface of the combustion chamber, control plates 13 are mounted in a sliding manner so as to slidably move in a direction generally parallel to the central axis 3 on external side 1A of the outer wall 1. The control plates 13 are guided at one of their ends by studs 14 and collar 15, and may be guided at their other ends by pins 16 which extend from the outer wall 1.

Stub shaft 17 is rigidly attached to, and extends from an end of each of the control plates 13 such that it slidably engages an oblique slot 18 defined by the actuating ring 19, which rotates about the central axis 3. The engagement of the stub shafts 17 with the oblique slots 18 are such that the control plates 13 are moved axially, generally parallel to the central axis 3 as the actuating ring 19 is pivoted about the central axis 3.

Figure 2:
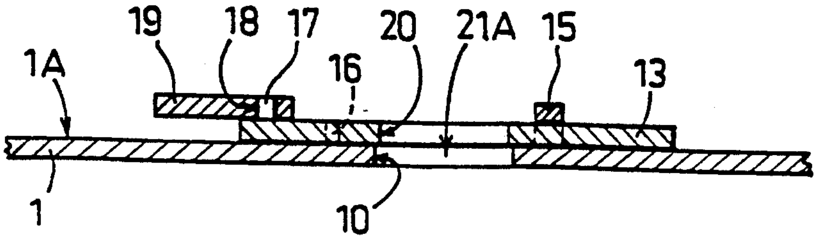
FIG. 2 is a partial, cross-sectional view taken along II—II in FIG. 1.

Each control plate 13 defines a second elongated primary oxidizer intake orifice 20 having a shape and dimensions substantially identical to those of the first primary oxidizer intake orifices 10. As illustrated, the second orifices 20 lie in an annular array extending about the central axis 3 such that each is circumferentially aligned with a first orifice 10. FIGS. 1 and 2 illustrate first axial operational positions for each control plate 13 in which the second primary oxidizer intake orifices 20 are substantially superimposed over a first oxidizer intake orifice 10 such that the first and second orifices are substantially congruent. The overlapping portions of the first and second orifices 10 and 20 define a primary oxidizer intake passageway 21A which, in this particular operational position, has a cross-sectional area equal to that of the second primary oxidizer intake orifice 20. Primary oxidizer passing through the primary oxidizer passageway 21A is added to the combustion oxidizer, already introduced into the combustion chamber through the intake orifices 6, to carry out the utmost possible combustion of the injected fuel.

Figure 5:
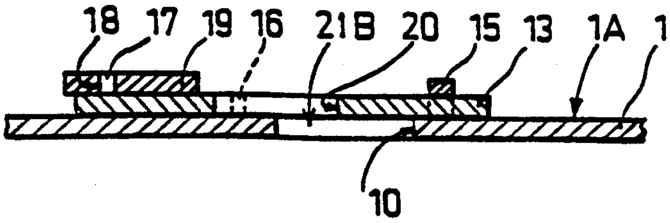
FIG. 5 is a cross sectional view taken along line V—V in FIG. 4.

In the second operational position of the control plates 13, illustrated in FIGS. 4 and 5, the control plates 13 are axially displaced towards the closed end 4 of the combustion chamber such that each second oxidizer intake orifice 20 only partially overlaps a corresponding first oxidizer intake orifice 10. The overlapping portions of the first and second orifices 10 and 20 define the primary oxidizer passageway 21B in this configuration, which has a smaller cross-sectional area than that of passageway 21A when the elements are in their positions illustrated in FIGS. 1 and 2. As can be seen, the portions of the first oxidizer are covered by the control plates 13 is that portion which is most remote from the closed end 4 of the combustion chambers. Thus, not only is the cross-sectional area of the primary oxidizer passageway 21B less than that of the corresponding cross-sectional area of oxidizer passageway 21A, but the most downstream portion of oxidizer intake passageway 21B is closer to the end wall 4 than is the most downstream portion of the passageway 21A. Thus, it can be seen that not only is the most downstream portion of the passageway 21B (as is the geometric center of the passageway) moved closer to the closed end wall 4, but the cross-sectional area of the passageway 21B has also been reduced.

Figure 3:
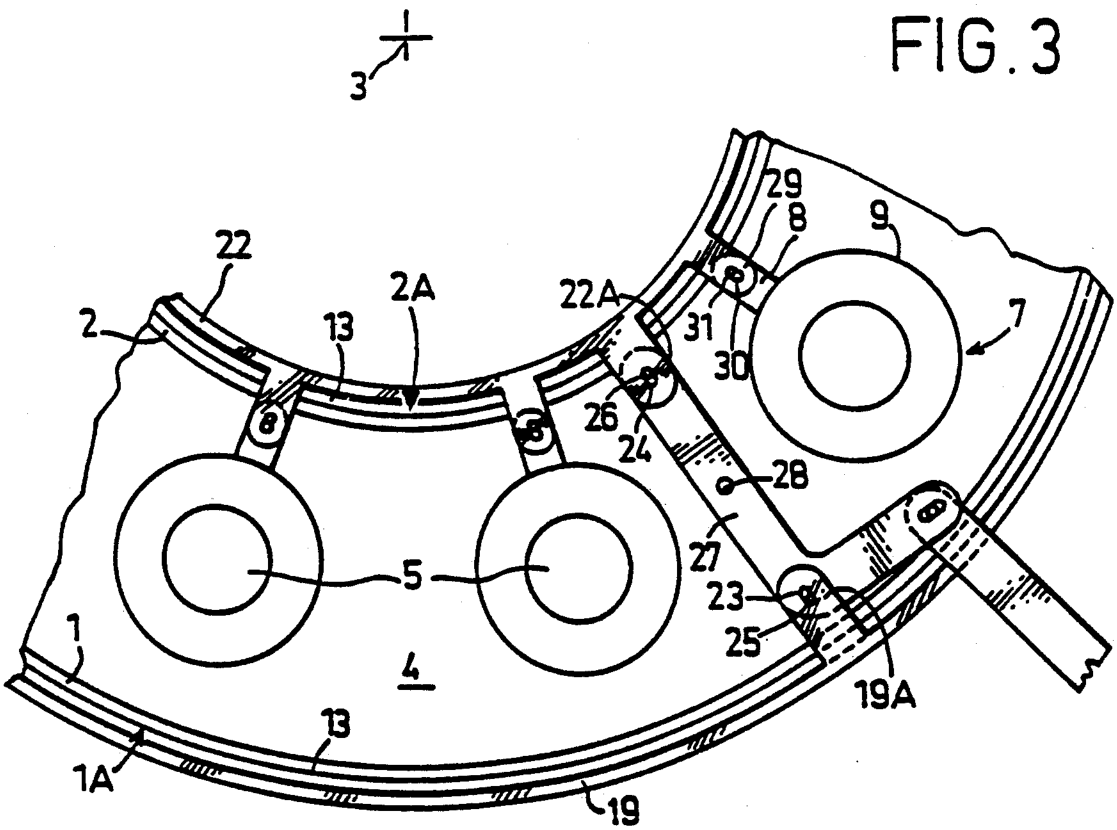
FIG. 3 is a partial view of the combustion chamber according to the present invention taken in the direction of Arrow F in FIG. 1.
Figure 6:
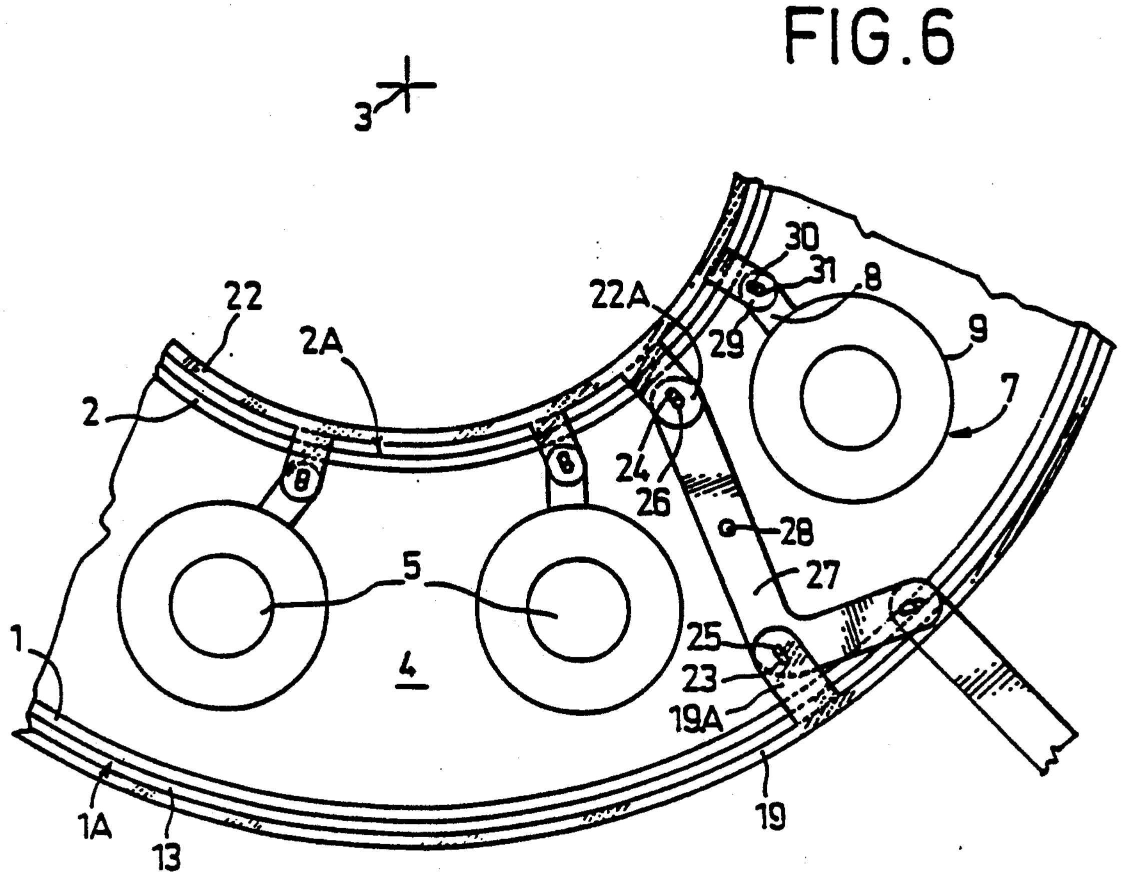
FIG. 6 is a partial view taken in the direction of Arrow G in FIG. 4.

The inner wall 2 is designed in the same manner and incorporates additional control plates as does the outer wall 1. As best illustrated in FIGS. 3 and 6, the inner wall has an actuating ring 22 slidably mounted thereon so as to rotate about the central axis 3. As previously described, the control ring 22 controls axial movement of additional control plates 13 which are slidably mounted on external surface 2A of the inner wall 2 so as to slide in directions generally parallel to the central axis 3. The designs of the first and second primary oxidizer intake orifices, the control plates and the actuating ring are identical to that previously described.

The simultaneous rotation of actuating rings 19 and 22 may be achieved by the linkage mechanism illustrated in FIGS. 3 and 6. Tabs 19A and 22A extend from the actuating rings 19 and 22, respectively and define openings 23 and 24 which slidably receive stubs 25 and 26 rigidly attached to, and extending from lever 27. Lever 27 is pivotally mounted on the exterior surface of end 4 of the combustion chamber so as to pivot about shaft 28 which extends generally parallel to the central axis 23. As can be seen in FIGS. 3 and 6, pivoting movement of lever 27 about shaft 28 causes the simultaneous rotation of actuating rings 19 and 22 so as to simultaneously control the axial positions control plates 13.

Figure 9:
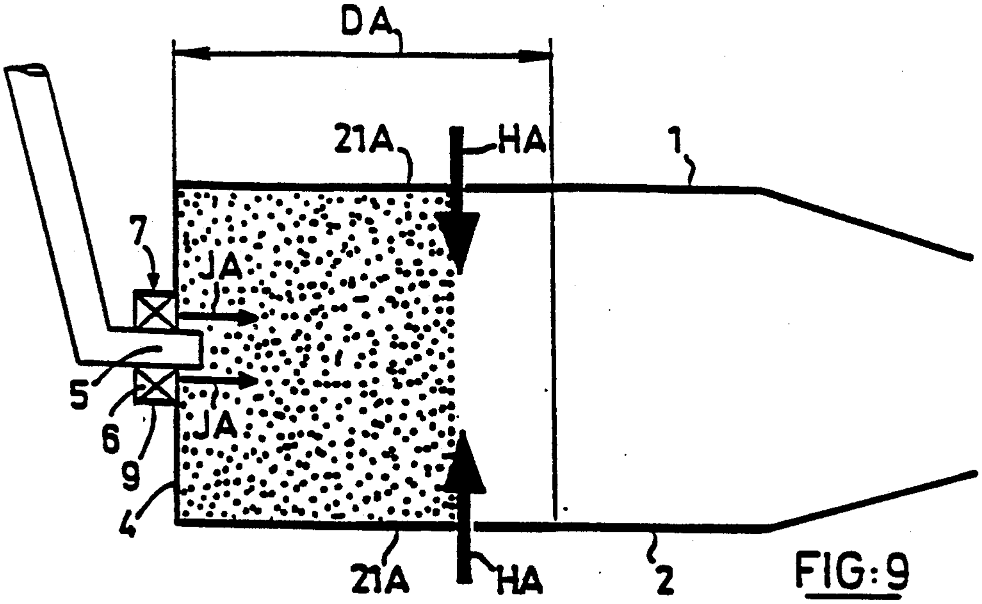
FIG. 9 is a schematic, longitudinal cross-sectional view of the combustion chamber according to the present invention illustrating the oxidizer flows with the control plates in first positions.
Figure 10:
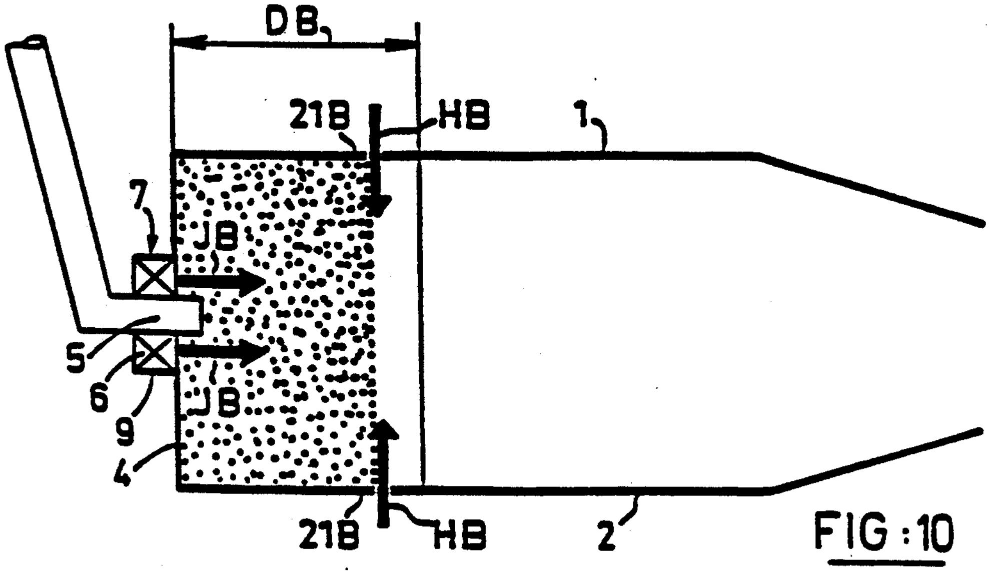
FIG. 10 is a schematic view similar to FIG. 9 illustrating the oxidizer flows with the control plates in second positions.

If oxidizer intake control diaphragm devices 7 are incorporated into the combustion chamber design, these may also be simultaneously controlled by the rotating movement of the actuating rings 19 and 22. This may be achieved by tabs 29 extending from inner actuating ring 22 which are connected to levers 8 by stubs 31 extending through openings 30. Accordingly, the rotation of actuating ring 22 about axis 3 will cause the diaphragm collars 9 to also rotate about their respective axes in order to control the opening of the combustion oxidizer intake orifices 6. As illustrated in FIGS. 9 and 10, the primary oxidizer flow through the oxidizer intake passageways 21A is illustrated by arrows HA and is at a maximum through the passageway 21A. The flow of combustion oxidizer through the intake orifices 6 is illustrated by arrows JA and, as can be seen, is at a minimum. In FIG. 10, the mechanism has been moved such that the control plates 13 are in their positions illustrated in FIGS. 4–6. In these positions, the combustion flow HB through the oxidizer intake passageways 21B is at a minimum while the combustion oxidizer flow JB through the combustion oxidizer intake orifice 6 is at a maximum. In this manner, the total pressure drop of the intake primary and combustion oxidizer is substantially constant.

FIGS. 9 and 10 also illustrate the distance between the most downstream portion of the oxidizer intake passageway from the upstream, closed end wall 4. In FIG. 9, this distance is illustrated as DA while in FIG. 10, this distance is indicated as DB. Quite obviously, distance DB is less than DA.

Figure 7:
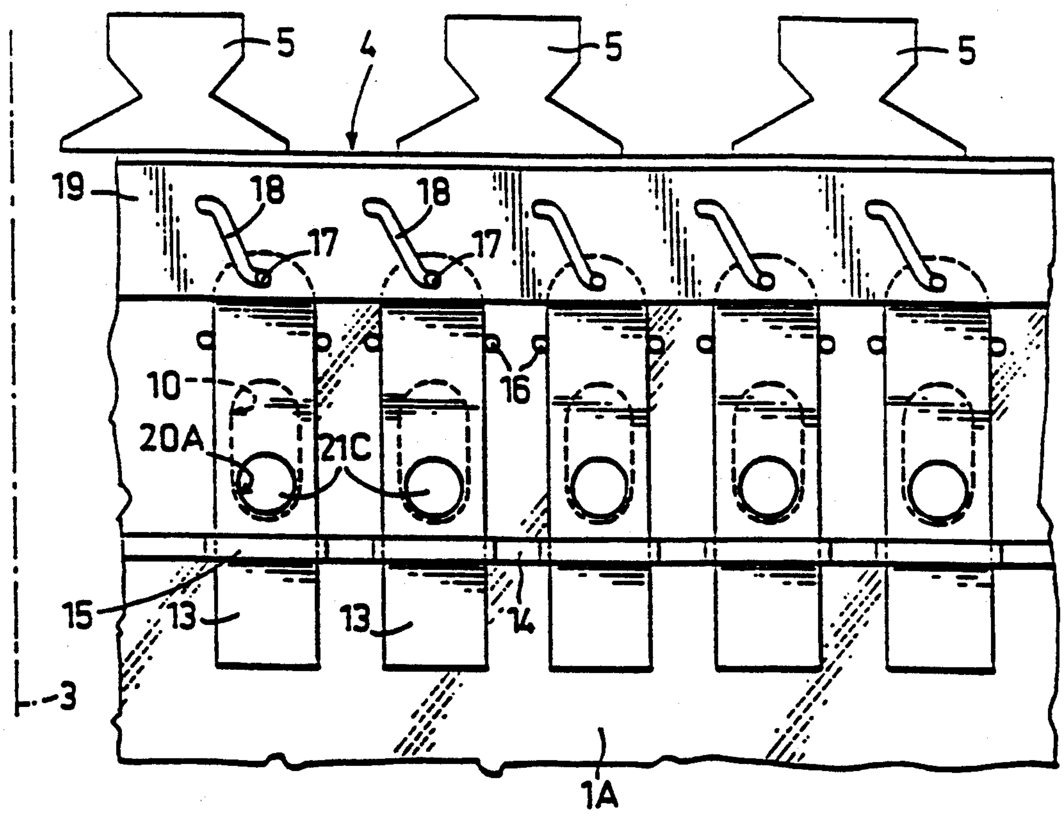
FIG. 7 is a partial, developed top view of a second embodiment of the combustion chamber structure according to the present invention illustrating the control plates in first positions.
Figure 8:
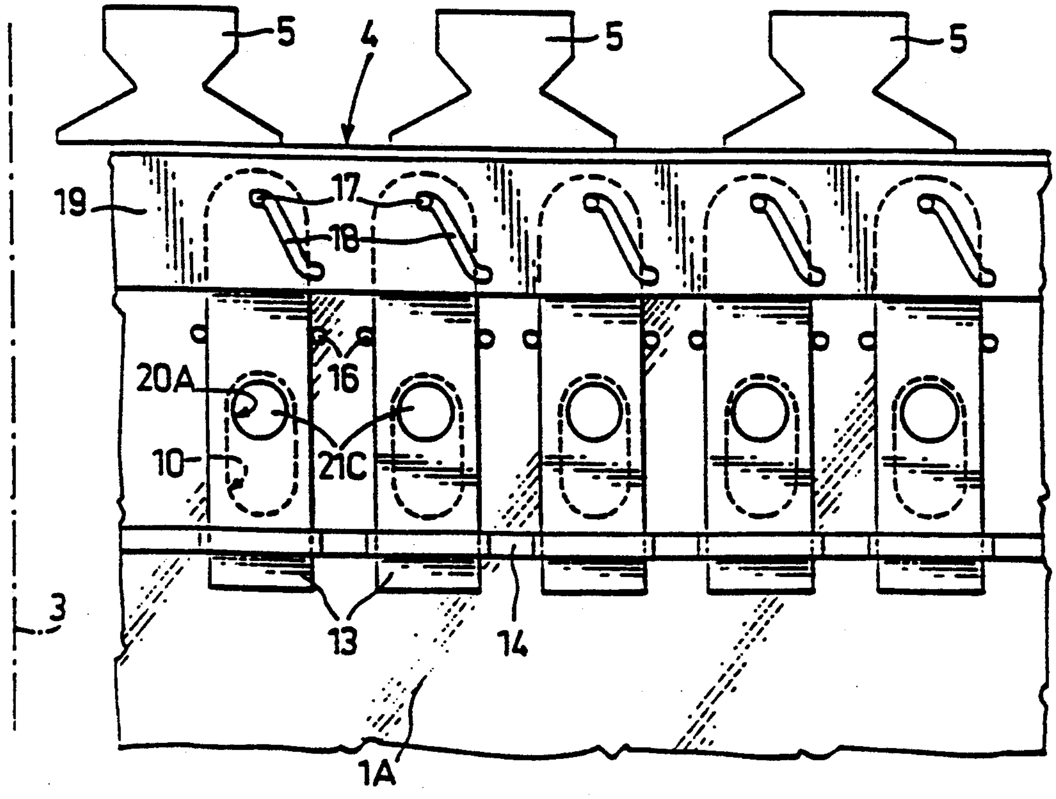
FIG. 8 is a view similar to FIG. 7 illustrating the control plates in second positions.
Figure 11:
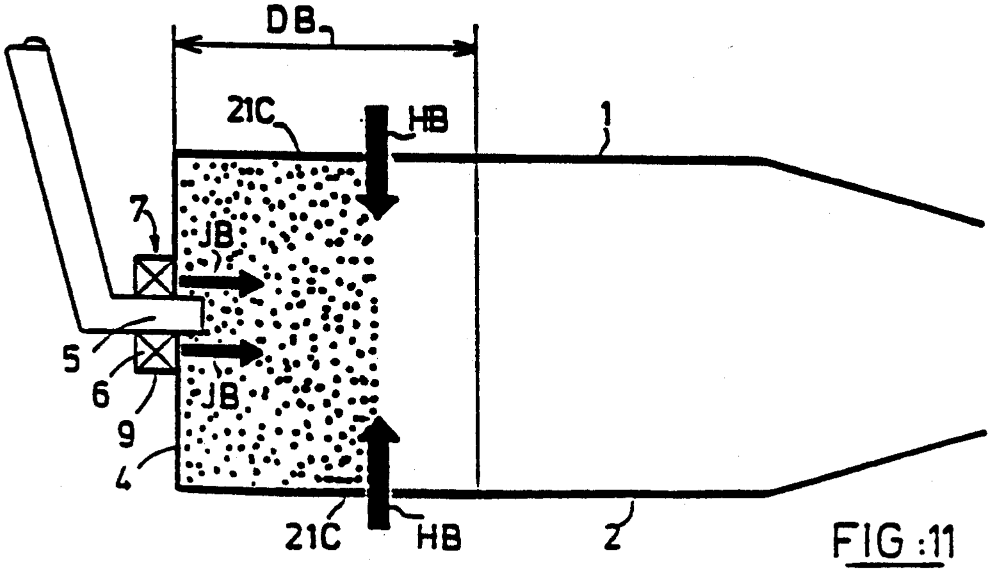
FIG. 11 is a schematic, longitudinal, cross-sectional view of the combustion chamber illustrated in FIGS. 7 and 8 showing the oxidizer flows with the control plates in second positions.

The embodiment of the invention illustrated in FIGS. 7 and 8 differs from that previously described solely by the shape of the second primary oxidizer intake orifices 20A defined by the control plates 13. As can be seen, the second orifices 20A are substantially circular in cross-sectional configuration and have a diameter generally equal to the distance between the opposite sides 11 of the first oxidizer intake orifices 10. As the control plates 13 are moved between their extreme positions, illustrated in FIGS. 7 and 8, the second oxidizer intake orifices 20A always overlap an associated first primary oxidizer intake orifice 10. Thus, in this embodiment, the cross-sectional area of the primary oxidizer intake passageway 21C remains constant and is equal to the cross-sectional area of the second primary oxidizer intake orifice 20A. However, as in the previously described embodiment, the axial position of each primary oxidizer intake passageway 21C axially varies with respect to the end wall 4 of the combustion chamber due to the rotation of actuating rings 19 and 22. FIG. 11 illustrates a schematic cross-sectional view of the combustion chamber showing the oxidizer flows for the embodiment illustrated in FIGS. 7 and 8 which corresponds to FIG. 10 describing the first embodiment. The primary oxidizer flows through the oxidizer passageways 21C are illustrated by arrows HB, while the combustion oxidizer flows through the combustion oxidizer intakes 6 are illustrated by arrows JB. The distance between the most downstream portion of the primary oxidizer passageway 21C and the closed end wall 4 of the combustion chamber is illustrated by dimension DB.

The combustion chamber according to this invention allows the position of the primary oxidizer intake passageways to be adjusted relative to the end of the combustion chamber in both embodiments. When the primary oxidizer intake passageways are located their furtherest distance away from the upstream end 4 of the combustion chamber, a relatively long dwell time of the combustion gases in the combustion chamber is allowed, thereby enhancing the combustion stability during low power operation, as well as reducing the emissions of carbon monoxide and unburned hydrocarbons. When the mechanism is adjusted to move the positions of the primary oxidizer intake passageways closer to the end wall 4, the dwell time of the combustion gases is reduced, thereby reducing the emissions of nitrogen oxides during full power operations. In addition, the embodiment illustrated in FIGS. 1–6 also allows the adjustment of the cross-sectional area of the primary oxidizer intake passageways.

When the primary oxidizer intake passageway control system according to this invention is combined with the diaphragm control mechanism for controlling the combustion oxidizer intake, it is possible to maintain a constant pressure drop to ensure satisfactory operations downstream of the combustion chamber.

The foregoing description is provided for illustrative purposes only, and should not be construed as in any way limiting this invention, the scope of which is defined solely by the appended claims.

We claim:

1. A combustion chamber structure for a gas turbine engine comprising:

1 a) wall means defining opposite sides and an end of a combustion chamber such that the combustion chamber extends around a central, longitudinal axis;

b) means to inject fuel into and allow combustion oxidizer to enter the combustion chamber through the end wall wherein the means has a movable diaphragm means to control the amount of combustion air entering the combustion chamber between minimum and maximum amounts;

c) a plurality of first primary oxidizer orifices defined by the wall means and communicating with the combustion chamber, the plurality of first primary oxidizer orifices being axially spaced from the end of the combustion chamber;

d) control means defining a plurality of second primary oxidizer orifices in circumferential alignment with the plurality of first primary oxidizer orifices such that aligned portions of each first and second primary oxidizer orifices define a primary oxidizer passageway, the control means operatively associated with the wall means so as to be movable with respect to the wall means in a direction generally parallel to the central axis between first and second positions, such axial movement varying the axial distance between the tend of the combustion chamber and the primary oxidizer passageways between a minimum distance and a maximum distance wherein the control means comprises a plurality of control plates, each control plate defining at least one second primary oxidizer orifice and being axially movable with respect to the wall means;

1 e) actuating means operatively associated with the control means so as to move the control means between its first and second positions wherein the actuating means comprises i) An actuating ring operatively associated with the wall means so as to rotate about the central axis with respect to the wlal means, and, ii) connection means operatively connecting the actuating ring and the plurality of control plates such that rotational movement of the actuating ring causes axial movement of the control plates; and f) link means operatively connecting the actuating ring and the movable diaphragm means such that rotation of the actuating ring causes movement of the diaphragm means so as to adjust the amount of combustion air entering the combustion chamber.

2. The combustion chamber structure of claim 1 wherein the connection means comprises:

a) a plurality of oblique slots defined by the actuating ring; and, b) a stub shaft extending from each control plate and engaging an oblique slot.

3. The combustion chamber structure of claim 1 further comprising:

a) first and second actuating rings operatively associated with the wall means so as to each rotate about the central axis with respect to the wall means; and, b) a lever pivotally attached to the wall means defining the end of the combustion chamber and operatively attached to the first and second actuating rings such that pivoting movement of the lever causes rotational movement of the first and second actuating rings.

4. The combustion chamber structure of claim 1 wherein the first primary oxidizer orifices have an axially elongated configuration with opposite parallel sides extending generally parallel to the central axis.

5. The combustion chamber structure of claim 4 wherein the second primary oxidizer orifices have an axially elongated configuration substantially similar to the first primary oxidizer orifices such that, when the axial distance between the end of the combustion chamber and the primary oxidizer passageways is at a maximum the first and second primary oxidizer orifices are aligned so as to maximize the cross-sectional areas of the primary oxidizer passageways, and when the axial distance between the end of the combustion chamber and the primary oxidizer passageways is at a minimum, the first and second oxidizer orifices are offset so as to reduce the cross-sectional areas of the primary oxidizer passageways from their maximum areas.

6. The combustion chamber structure of claim 5 wherein the link means operatively connects the actuating ring and the movable diaphragm means such that rotation of the actuating ring causes movement of the diaphragm means so as to adjust the amount of combustion air entering the combustion chamber such that when the cross-section areas of the primary oxidizer passageways are at maximum, the amount of combustion air entering the combustion chamber through the diaphragm means is at its minimum and vice versa.

7. The combustion chamber structure of claim 4 wherein the control means defines second primary oxidizer orifices generally circular in configuration and located such that each second primary oxidizer orifices remains aligned with a first primary oxidizer orifice throughout the range of its axial movement such that the cross-sectional areas of the primary oxidizer passageways do not vary between the first and second positions of the control means.

8. The combustion chamber structure of claim 1 wherein the wall means defines opposite sides of the combustion chamber having external surfaces and further comprising means to movably attach the control plates to the wall means such that they are located on the external surface.

9. A combustion chamber structure for a gas turbine engine comprising:

a) wall means defining opposite sides and an end of a combustion chamber such that the combustion chamber extends around a central, longitudinal axis;

b) means to inject fuel into and allow combustion oxidizer to enter the combustion chamber through the end wall;

c) a plurality of first primary oxidizer orifices defined by the wall means and communicating with the combustion chamber, the plurality of first primary oxidizer orifices being axially spaced from the end of the combustion chamber wherein the first primary oxidizer orifices have an axially elongated configuration with opposite parallel sides extending generally parallel to the central axis;

d) control means defining a plurality of second primary oxidizer orifices in circumferential alignment with the plurality of first primary oxidizer orifices such that aligned portions of each first and second primary oxidizer orifices define a primary oxidizer passageway, the control means operatively associated with the wall mean so as to be movable with respect to the wall means in a direction generally parallel to the central axis between first and second positions, such axial movement varying the axial distance between the tend of the combustion chamber and the primary oxidizer passageways between a minimum distance and a maximum distance wherein the control means defines second primary oxidizer orifices generally circular in configuration and located such that each second primary oxidizer orifices remains aligned with a first primary oxidizer orifice throughout the range of its axial movement such that the cross-sectional areas of the primary oxidizer passageways do not vary between the first and second positions of the control means; and e) actuating means operatively associated with the control means so as to move the control means between its first and second positions.

10. The combustion chamber structure of claim 9 wherein the control means comprises a plurality of control plates, each control plate defining at least one second primary oxidizer orifice and being axially movable with respect to the wall means.

11. The combustion chamber structure of claim 10 wherein the actuating means comprises:

a) an actuating ring operatively associated with the wall means so as to rotate about the central axis with respect to the wall means; and b) connection means operatively connecting the actuating ring and the plurality of control plates such that rotational movement of the actuating ring causes axial movement of the control plates.

12. The combustion chamber structure of claim 11 wherein the connection means comprises:

a) a plurality of oblique slots defined by the actuating ring; and b) a stub shaft extending from each control plate and engaging an oblique slot.

13. The combustion chamber structural of claim 11 further comprising:

a) first and second actuating rings operatively associated with the wall means so as to each rotate about the central axis with respect to the wall means; and b) a lever pivotally attached to the wall means defining the end of the combustion chamber and operatively attached to the first and second actuating rings such that pivoting movement of the lever cases rotations movement of the first and second actuating rings.

14. The combustion chamber structure of claim 11 wherein the means to inject fuel and allow combustion air to enter the combustion chamber has movable diaphragm means to control the amount of combustion air entering the combustion chamber between minimum and maximum amounts and further comprising link means operatively connecting the actuating ring and the movable diaphragm means such that rotation of the actuating ring causes movement of the diaphragm means so as to adjust the amount of combustion air entering the combustion chamber.

15. The combustion chamber structure of claim 10 wherein the wall means defines opposite sides of the combustion chamber having external surfaces and further comprising means to movable attach the control plates to the wall means such that they are located on the external surface.

* * * * *